United States Patent
Dasgupta et al.

(10) Patent No.: US 9,912,657 B2
(45) Date of Patent: Mar. 6, 2018

(54) ADAPTIVE MULTI-FACTOR AUTHENTICATION SYSTEM

(71) Applicants: Dipankar Dasgupta, Germantown, TN (US); Abhijit Kumar Nag, Memphis, TN (US); Arunava Roy, Memphis, TN (US)

(72) Inventors: Dipankar Dasgupta, Germantown, TN (US); Abhijit Kumar Nag, Memphis, TN (US); Arunava Roy, Memphis, TN (US)

(*) Notice: Subject to any disclaimer, the term of this patent is extended or adjusted under 35 U.S.C. 154(b) by 93 days.

(21) Appl. No.: 14/968,676

(22) Filed: Dec. 14, 2015

(65) Prior Publication Data

US 2016/0359838 A1 Dec. 8, 2016

Related U.S. Application Data

(60) Provisional application No. 62/169,991, filed on Jun. 2, 2015, provisional application No. 62/262,626, filed on Dec. 3, 2015.

(51) Int. Cl.
*H04L 29/06* (2006.01)
*G06F 21/32* (2013.01)
(Continued)

(52) U.S. Cl.
CPC .......... *H04L 63/083* (2013.01); *G06F 21/316* (2013.01); *G06F 21/32* (2013.01);
(Continued)

(58) Field of Classification Search
CPC ... H04L 63/08; H04L 63/083; H04L 63/0861; G06F 21/31; G06F 21/32; G06F 21/316; G06F 21/40; G06F 21/44; G06F 21/45
(Continued)

(56) References Cited

U.S. PATENT DOCUMENTS 6,807,181 B1 * 10/2004 Weschler .......... H04L 29/12169
370/400
7,260,724 B1 * 8/2007 Dickinson ............... H04L 63/08
713/182
(Continued)

OTHER PUBLICATIONS

PCT International Search Report and Written Opinion, PCT/US16/35393, Dasgupta et al., filed Jun. 6, 2016.
Nag, et al., "An Adaptive Approach for Continuous Multi-factor Authentication in an Identity Eco-System," CISR '14, Apr. 8-10, 2014.

*Primary Examiner* — Hosuk Song
(74) *Attorney, Agent, or Firm* — Wayne Edward Ramage; Baker Donelson

(57) ABSTRACT

A system and methodology for adaptive selection of multiple modalities for authentication in different operating environments, thereby making authentication strategy unpredictable so to significantly reduce the risk of exploitation by authentication-guessing attacks. The system calculates trustworthiness values of different authentication factors under various environmental settings, and combines a trust-based adaptive, robust and scalable software-hardware framework for the selection of authentication factors for continuous and triggered authentication with optimal algorithms to determine the security parameters of each of the authentication factors. A subset of authentication factors thus are determined for application at triggering events on-the-fly, thereby leaving no exploitable a priori pattern or clue for hackers to exploit.

10 Claims, 7 Drawing Sheets

(51) Int. Cl.
    *G06F 21/31*    (2013.01)
    *G06F 21/36*    (2013.01)
    *G06F 21/40*    (2013.01)
    *G06F 21/45*    (2013.01)

(52) U.S. Cl.
    CPC .............. *G06F 21/36* (2013.01); *G06F 21/40* (2013.01); *G06F 21/45* (2013.01); *H04L 63/08* (2013.01); *H04L 63/0861* (2013.01); *H04L 2463/082* (2013.01)

(58) Field of Classification Search
    USPC .................. 726/2–7; 713/168, 182, 185, 186
    See application file for complete search history.

(56) References Cited

U.S. PATENT DOCUMENTS

| | | | |
|---|---|---|---|
| 7,802,104 B2* | 9/2010 | Dickinson | H04L 63/08 713/182 |
| 8,302,176 B2* | 10/2012 | Huang | G06F 21/34 713/168 |
| 8,307,210 B1* | 11/2012 | Duane | H04L 9/0897 380/42 |
| 9,215,069 B2* | 12/2015 | Ruan | H04L 9/3066 |
| 2005/0125674 A1* | 6/2005 | Nishiki | G07C 9/00031 713/182 |
| 2006/0129838 A1 | 6/2006 | Chen et al. | |
| 2013/0219481 A1 | 8/2013 | Voltz | |
| 2015/0089585 A1 | 3/2015 | Novack | |

* cited by examiner

| Modality | Computational Features | Summary |
|---|---|---|
| Face (M1)  110 | Lip: Lip center position($x_c$ and $y_c$), the lip shape ($h_1$, $h_2$ and w), lip orientation ($\theta$) Eye: a circle with three parameters ($x_0$, $y_0$ and r) for Iris; two parabolic arcs with six parameters($x_c$, $y_c$, $h_1$, $h_2$, w, $\theta$) to model boundaries of eye; The last one differs in closed and open eye position. Brow and Check: Left and right brow: triangular template with six parameters (x1, y1), (x2, y2) and (x3, y3). Cheek has six parameters (both up and downward triangle template) Both brow and cheek templates are tracked using Lucas-Kanade algorithm | Lip: f1, f2 and f3. Eye: f4, f5 Brow and Check: f6, f7 Total: 7 category features |

FIG. 4

| Modality | Computational Features | Summary |
|---|---|---|
| Password (M3)  130 | 1. Master password<br>2. Key pattern<br>3. Security question<br>4. Profile information | Total: 4 types |
| CAPTCHA (M4) 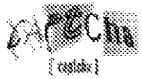 140 | 1. only numbers<br>2. only characters<br>3. alphanumeric characters<br>4. pictorial CAPTCHA | Total: 4 types |
| SMS (M5) 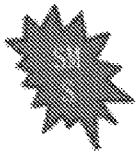 170 | 1. any number or character<br>2. emoticon<br>3. special character sequence showing a message | Total: 3 types |
| Voice (M6) 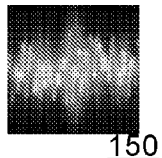 150 | Pitch, different formant features (F1, F2 and F3) | Total: 4 features (but each of them are vectors not a scalar quantity) |
| Keystroke (M7)  160 | 1. Key hold time (how long a key is pressed)<br>2. Error Rate (number of times backspace is pressed)<br>3. Horizontal Digraph: time to switch between horizontally adjacent keys<br>4. Vertical Digraph: time to switch between vertically adjacent keys<br>5. Non-Adjacent Horizontal Digraph: time to switch between non-adjacent horizontal keys<br>6. Non-Adjacent Vertical Digraph: time to switch between non-adjacent vertical keys | Total: 6 features. |

FIG. 6

| Device Type | Connection Media | Environment | Frequency of Authentication | No. of Modalities Activate |
|---|---|---|---|---|
| Fixed Device | Wired | Private | Static | small |
| | | Public with Login | Semi-static | medium |
| | Wireless | Public with Login | Semi-static | medium |
| Portable Device | Wired | Private | Static | small |
| | | Public with Login | Semi-static | medium |
| | Wireless | Public Hotspot | Dynamic | large |
| | | Public with Login | Semi-static | medium |
| Handheld Device | Wireless | Public Hotspot | Dynamic | large |
| | | Public with Login | Semi-static | medium |
| | Cellular | Public with Login | Semi-static | medium |
| Internet of Things | Wired | Private | Static | medium |
| | Wireless | Public with Login | Semi-static | large |

FIG. 7

ADAPTIVE MULTI-FACTOR AUTHENTICATION SYSTEM

This application claims benefit of and priority to U.S. Provisional Application No. 62/169,991, filed Jun. 2, 2015, and U.S. Provisional Application No. 62/262,626, filed Dec. 4, 2015, by Dipankar Dasgupta, et al., and is entitled to those filing dates for priority. The specifications, figures, appendices, and complete disclosures of U.S. Provisional Application Nos. 62/169,991 and 62/262,626 are incorporated herein by specific reference for all purposes.

FIELD OF INVENTION

This invention relates to a system and related methods for multi-factor authentication of user identity for access to a computing device, system, or resource, including access through the Internet.

BACKGROUND OF THE INVENTION

At present, many user activities rely upon trusted and secure access to various computing or cyber devices, systems, resources, or services. Authentication is the main defense to address the issue of illegitimate access. Basic authentication processes using a single factor (e.g., user ID and password) are widely used, but have significant problems. Such systems are relatively easy to breach, and, in addition, if the single factor authentication system fails, the user cannot access the system.

Multi-factor authentication (MFA) systems have been developed to help increase secure access. Two-factor authentication systems, for example, check for two different factors at the time of accessing a computer-based online service. However, with the increasing sophistication of technology, these systems do not provide adequate security in many cases. From a security perspective, the critical question for MFA systems is what authentication factors need to be employed in different operating conditions in order to address authentication-related security breaches in a better way. Existing MFA systems generally follow static factor selection policies that do not choose the authentication factors based on present security risks of dynamic operating environments. As a result, the use of the same set of authentication factors in all situations becomes less effective and more predictable, and their vulnerabilities get exposed to hackers.

SUMMARY OF THE INVENTION

In various exemplary embodiments, the present invention comprises a system and methodology for adaptive selection of multiple modalities for authentication in different operating environments, thereby making authentication strategy unpredictable so to significantly reduce the risk of exploitation by authentication-guessing attacks. This system incorporates a novel approach of calculating trustworthy values of different authentication factors under various environmental settings. The present system comprises: (i) a trust-based adaptive, robust and scalable software-hardware framework for the selection of authentication factors for continuous and triggered authentication; and (ii) stochastic optimal selection procedures to determine the best set of authentication factors through sensing devices, media, and surrounding conditions.

A subset of authentication factors are determined (at triggering events) on-the-fly, thereby leaving no exploitable a priori pattern or clue for hackers to exploit. Adaptive authentication provides legitimacy of user transactions with an added layer of access protection that does not rely on a priori selection or policy for the use of a set of authentication modalities. Robustness of the system is maintained through designing the framework so that if any authentication modality data is compromised, the system can still perform flawlessly using other non-compromised modalities. Scalability is provided by adding newly available authentication modalities with existing set of modalities, and generating as well as tuning the operating and configuration parameters for the added modalities.

The present invention addresses the challenges of integrating the cyber-physical operating environment, user preference, types of applications, and mode of communication by adaptively selecting a subset of authentication factors (biometric and non-biometric, active and passive) that are most trustworthy for specific operational environmental settings. No prior art authentication system supports adaptive and dynamic selection of multi-factor authentication incorporating the environment settings (e.g., device, medium, surrounding conditions, and the like) with a significant number of authentication modalities.

The present invention works with different varieties and combinations of computing devices (e.g., desktop, laptop, hand-held devices), operating media (e.g., wired, wireless, cellular connection), and surrounding or ambient conditions (e.g., lighting, noise, sound, motion).

BRIEF DESCRIPTION OF THE DRAWINGS

FIGS. 4 through 6 show exemplary tables of different computational features for various modalities.

FIG. 7 shows an exemplary table of criteria for selecting authentication modalities.

DETAILED DESCRIPTION OF EXEMPLARY EMBODIMENTS

In various exemplary embodiments, the present system provides an adaptive multi-factor authentication system and related methods that improves secure access to various computing devices, network-connected devices, systems, resources, or services. It allows for the checking of the authenticity of users not only at the initial time of accessing the service, but on an intermittent or continuous basis throughout the access period or session for a particular user. The system chooses the better or best set of a variety of authentication factors out of all possible choices for the given operating environment or conditions at the time of authentication. By adaptively selecting different factors, the present invention reduces the chances of compromising user identity and sensitive or confidential information throughout the access period or session.

Figure 1:
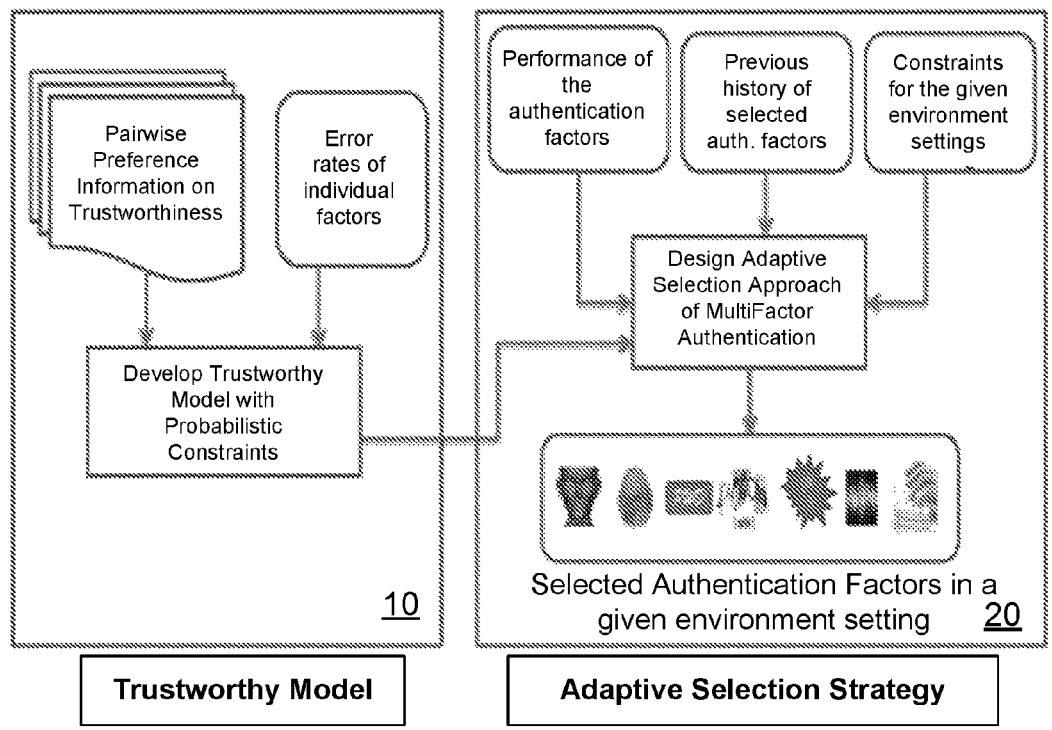
FIG. 1 shows a view of a system in accordance with an embodiment of the present invention.
Figure 2:
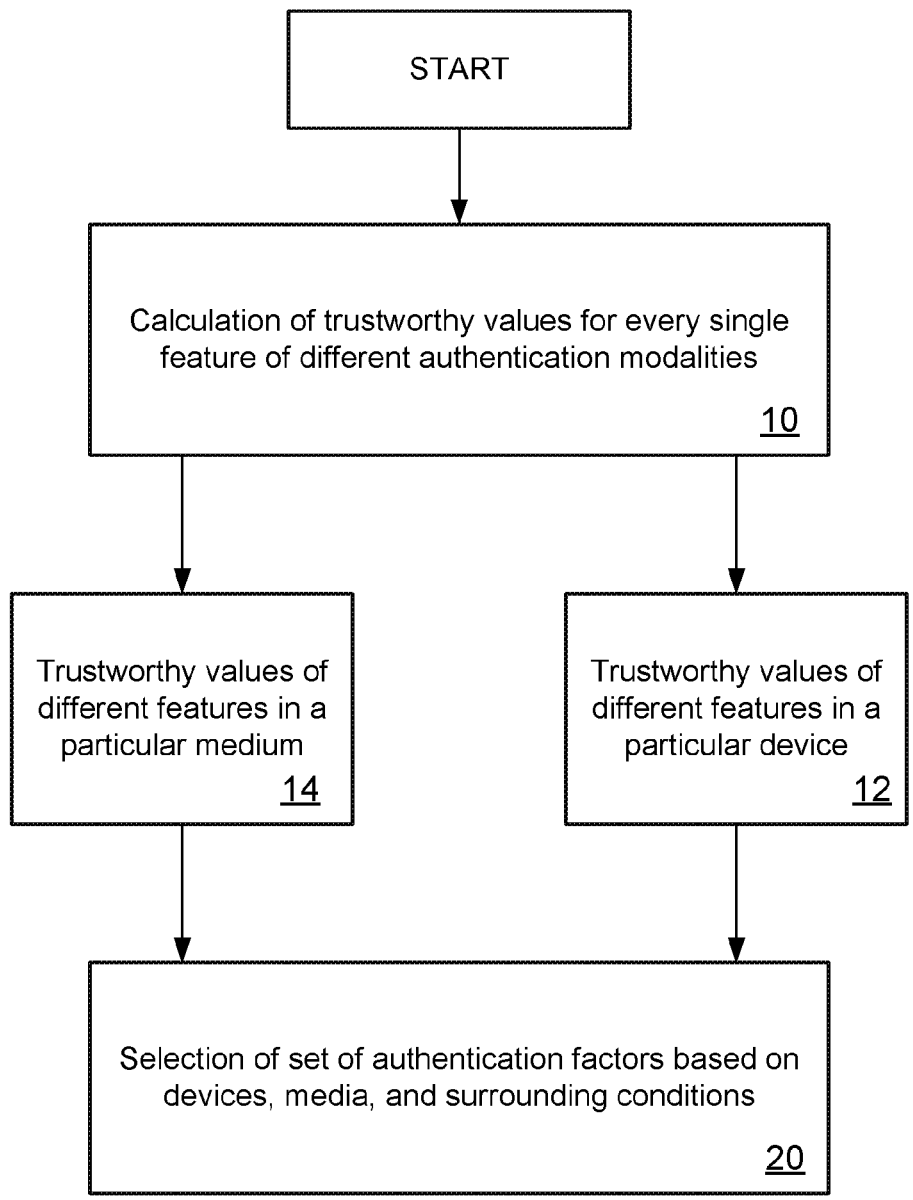
FIG. 2 is a diagram of a method in accordance with an embodiment of the present invention.

In one exemplary embodiment, as seen in FIGS. 1 and 2, the present invention comprises a mathematical model 10 for calculating the trustworthy values of different authentication factors. The trustworthy model computes the trust values for different authentication factors by considering several probabilistic constraints, and in particular, uses pairwise comparisons among different devices 12 and media 14.

The system then adaptively selects 20 several authentication factors based on the devices, media and surrounding conditions involved, including history of the previous selection of authentication factors. The effects of surrounding conditions are considered in the selection of authentication factors as some factors may be depending on the presence or absence of certain conditions (e.g., light within a valid range is necessary for face recognition; sound within a valid range is required for voice recognition).

In one embodiment, the selected set of factors for any specific authentication attempt has higher total trustworthy values and performances than alternatives, and is different from previous sets of selected modalities if the device, medium and surrounding conditions are the same. This is determined by a multi-objective non-linear quadratic optimization process with probabilistic constraints.

Different modalities for authentication of user identity include, but are not limited to, facial recognition 110, fingerprint recognition 120, password 130, security token, CAPTCHA 140, voice recognition 150, keystroke recognition 160, and verification code through SMS 170. Facial recognition is a commonly used modality for authentication in portable and hand-held devices. In such modalities, skin color based technique is used for detecting frontal human faces from the input image. The visual features, namely Profile Fourier Coefficients, are then extracted using template matching. Facial recognition is also used to combat terrorism in highly congested public areas, such as airports and country border security checkpoints. It uses principal component analysis to get the required features. The fingerprint is an example of a robust biometric media, where improved minutiae extraction algorithm is used to get the required features. Sometimes fingerprint verification methods are used to increase the security of authentication in embedded systems. But this modality has more computational complexity in comparison with other existing biometric modalities.

Voice recognition is also a frequently used biometric modality for authentication. To do the recognition task, different levels of features are extracted for pronouncing vowels and consonants like spectral characteristics, duration, sequence of occurrence etc. The overall accuracy of authentication can be quite high when results for many individual measurements are combined. But this type of recognition lacks robustness in noisy environments or public gatherings.

Although the biometric modality has uniqueness as its features for identifying a specific human being, it also suffers some drawbacks and limitations, and as a result, it is not good to design an active authentication system based on only biometrics. False reading or compilation errors sometimes occurs among biometrics. This type of vulnerability (false acceptance rate and false rejection rate) is the greatest disadvantage. For instance, fingerprints can be forged through copying and even can be altered by transplant surgery. The facial features also may be changed through plastic surgery, or wearing masks or prosthetics, and such methods have been adopted by cybercriminals around the world in order to by-pass security systems. Moreover, an effective biometric system is costly in nature and unaffordable for small or medium size companies, unable to deploy continuous authentication systems on a large scale.

Biometric modalities like voice recognition or iris recognition are also not reliable in cases of illness. If a user suffers from throat infection or eye disease, these modalities cannot serve the authentication purpose if they are the sole metrics used in authentication.

Further, in many companies or institutions the employees work from remote locations where they need to login to their remote business workstations. In this scenario, biometric authentication is also untenable if the employee device does not have such capabilities. Passwords, PIN codes, and passive authentications like keystroke and mouse movement are better choices in those sorts of scenarios.

In various embodiments of the present invention, both biometric and non-biometric modalities are incorporated and the balances of these modalities in selection are ensured through the objective functions. The above-mentioned modalities are user interceptive. As the usage of mobile computing devices increases, user non-interceptive modalities are becoming more vital for continuous authentication. Examples of this type of modality are keystroke analysis and mouse dynamics, touch-based and accelerometer, and gyroscope readings on mobile devices.

Keystroke analysis performs fairly well in many cases to authenticate legitimate users and to reject impostors. The user non-interceptive biometrics supports the remote access scenarios that are helpful for some cases like off-site office location access. But as they are not active authentication modalities, their performance (e.g., true positive rate of authentication) is not as high as the earlier modalities. Hence when chosen intelligently, both user interceptive and non-interceptive modalities can give the user a level of flexibility and at the same time ensure an efficient and secure authentication process.

The present invention facilitates significant and continual authentication to existing cyber-enabled or computer systems (specifically, mobile devices such as smart-phones, tablets and PDAs). Two-factor based authentication is now widely used. The second factor typically is SMS or pin-code with the traditional password. Prior art systems, however, use a fixed set of modalities and only depend on user preferences in modality selection. In contrast, the present invention provides adaptive selection of the available authentication modalities and considers different factors other than only user preference that safeguards from the imposter not being allowed to make his or her own choice of modality, which presumably he or she has compromised. It provides the active and continuous authentication in an additional layer, where the modalities are adaptively sensing the active device, media and surroundings.

Mobile devices are widely used now to do online activities, such as, but not limited to, browsing emails, checking bank accounts, and maintaining social network. The present invention provides continuous authentication of users in the context of mobile devices. Smartphone accelerometer features provide a way to identify the user pattern of how he/she holds the phone, and thereby deciding the genuine user of the mobile device. This also provides a means of gait-based user authentication.

Similarly, by analyzing the typing motion behavior of the users, continuous authentication can be performed. Typing motion profiles for the registered users help in identifying the actual users. Touchscreen gestures can also be used to do continuous authentication in mobile devices. Along with gestures, virtual typing (typing using a touch-screen based keyboard) and touch based drawing (drawing shapes using finger) can be used in performing mobile based continuous authentication. The present invention provides continuous user authentication for all the existing devices, and does not depend on specific hardware or platforms.

In addition, the present invention also addresses the factor of operating locations (e.g., home, office or coffee shop). One authentication modality cannot be always trusted in every available device and media context. The present system considers this factor and provides an adaptive selection of modalities to the users as required. If any modality data is compromised, users are still able to be authenticated using the sets of non-compromised modalities, unlike prior art systems.

The present invention combines the advantages of multi-factor and continuous authentication under one system to provide a more trustworthy, resilient, and scalable solution for authentication, and thus possess several advantages over the prior art. By considering individual features of different authentication modalities, the search space becomes larger, which reduces the probability of the same set of authentication modalities being selected. The level of trust is increased as the system can select those specific features of the authentication modalities that have higher trustworthy values. Biometric and non-biometric authentication modalities can be used simultaneously. Selection of modalities is adaptive based on surrounding conditions, and thus avoids not being able to provide authentication if particular modalities cannot function. If the selected set of authentication modalities only contains multiple features of the same modality (e.g., two different features of the face recognition modality), then the user does not need to use another authentication modality, thereby reducing annoyance of the user, and presenting the appearance of a single factor authentication system while still remaining an advanced, multi-factor authentication system. Further, by avoiding repetition of static authentication factors, the system is less predictable to hackers, thereby significantly increasing security.

Figure 5:

In one exemplary embodiment, the present invention comprises a system with a combination of seven authentication modalities: face recognition, fingerprint recognition, password, CAPTCHA, SMS, voice recognition, and keystroke analysis. Some modalities are active (i.e., need user intervention), while some modalities are passive (i.e., do not need user intervention). The features and computational logic for the modalities are stored on one or more computer servers, and a user is authenticated at various times with different modalities, as determined by the adaptive selection process of the present invention. In one embodiment, different modalities and related calculations are stored on different virtual machines (VMs), with the benefit of the modalities thereby being logically separate and run independently. A further benefit is that if any VM is compromised, the prevent invention will remove that modality from possible selections, and will be able to select from the remaining non-compromised modalities. FIGS. 4-6 show different levels of features for each of the authentication modalities for this exemplary embodiment.

In this exemplary embodiment, a genetic algorithm (GA) is used for adaptive selection of modalities and their corresponding features using the active authentication process. Implementation requires the appropriate design of chromosome, contracts, objection functions, and penalty functions. As an initial matter, the criteria for selecting an authentication modality has to be determined. Criteria include, but are not limited to, variably of devices, media and environment. The GA is encoded to represent both modalities and their features in the chromosome (i.e., the chromosome is represented in two levels, modality and features. FIG. 7 shows an example of criteria for selecting authentication modalities.

Figure 3:
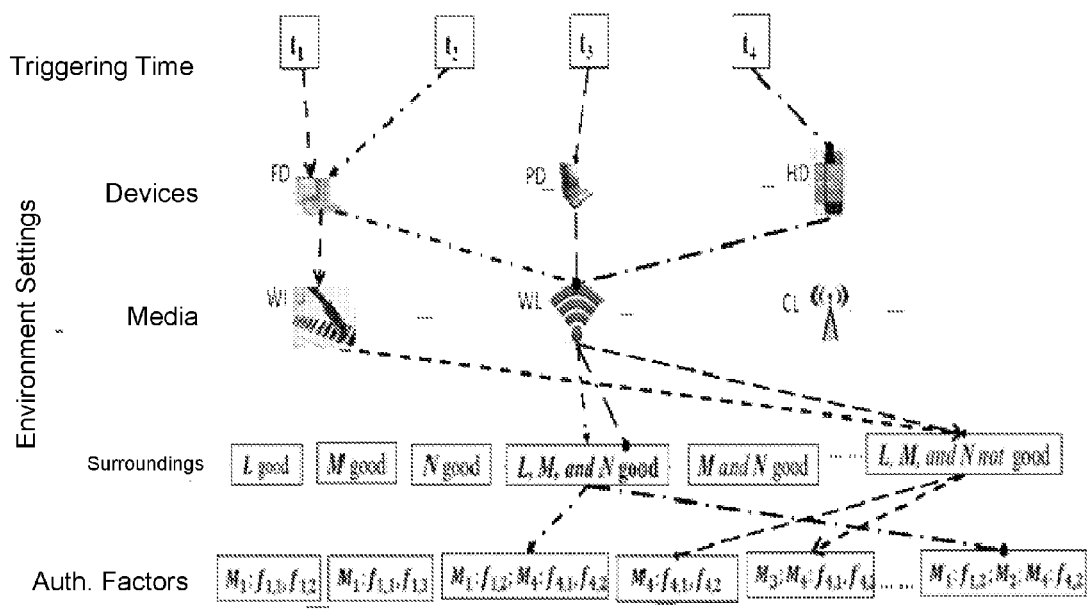
FIG. 3 shows an example of adaptive selection of a set of authentication factors in different device, media and surrounding conditions over time.

As seen in FIG. 3, these criteria may be triggered at different times by a user, and the selected set of authentication factors is expected to vary.

Different variants of device and media are considered to create constraints as well as objective and penalty function. The system uses a "trustworthiness" factor, which is expressed as a numeric value for particular types of devices and media, and signifies the impact of the device or media on a particular selected modality. In several embodiments, a higher value for trustworthiness factor indicates the particular modality is more trustworthy in the current settings. Trustworthiness factor determinations include, but are not limited to, consideration for the device (fixed device, portable device, handheld device), media (wired, wireless, cellular), documented historical or past vulnerabilities, user preference, and accuracy rate or false positive rate of the modality. Several of these considerations also can change with time and with user feedback, thereby resulting in changing trustworthiness values over time. This enhances the adaptive nature of the present, and helps prevent selection decisions from following any specific pattern. In this exemplary embodiment, for an authentication triggering event, the present invention determines the trustworthiness value T for each possible modality M according to the following formula:

$$T(M) = \Sigma_i (aX_i + bY_i + c)$$

where a, b and c are constants serving as weights to the trustworthiness variables X (representing device) and Y (representing media), and where i represents a particular modality (e.g., modality number, 1-7). The constants/weights are adjusted for different environment settings.

The present invention then determines a penalty function incorporating computational complexity and cost along with a weighting factor, so that one modality is not always chosen in successive authentication triggering events. In one embodiment, the computational complexity of the modalities is the same in all devices and media where the same algorithm is used in different environment settings. A different algorithm for a single modality may be used in different environment settings, in which case the computation complexity is another objection function. In one embodiment, the penalty value for a modality ($P_M$) is determined according to the following formula $$P_M = w_f * P_f$$

where $P_f$ is the cost factor for the particular modality, and $w_f$ is the weight factor. The weight factor controls the effect of the cost factor while computing fitness values for a set of modalities during the selection process. The weights of modalities that were previously selected are increased (i.e., penalized more), so those modalities will not continuously repeat with subsequent selections, thereby avoiding patterns of selection.

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A machine for improved secure access to computing devices, systems, resources, or services, comprising:
   one or more computer servers with authentication modality data stored thereon for a plurality of authentication modalities, wherein the authentication modality data for each authentication modality comprises a trustworthiness factor for each of one or more user input devices, a trustworthiness factor for each of one or more user connection media, and a computational complexity cost factor; and
   a processor or microprocessor, wherein the processor or microprocessor is programmed to determine one or more of said authentication modalities to use for an authentication verification event by:
   determining the objective trustworthiness value for each modality based on device trustworthiness factors and connection media trustworthiness factors for said modality;
   determining a penalty value for each modality based on the computation complexity cost factor for said modality and the previous selection history of said modality for previous authentication verification events;
   ranking the authentication modalities based on the objective trustworthiness value and the penalty value; and
   applying one or more authentication modalities in order of ranking.

2. The machine of claim 1, wherein the user input devices comprise fixed devices, mobile devices, hand-held devices, or combinations thereof.

3. The machine of claim 1, wherein the user media environments comprise wired, wireless, cellular, or combinations thereof.

4. The machine of claim 1, wherein authentication modality data for each authentication modality comprises a list of features applicable to that authentication modality.

5. The machine of claim 4, wherein one or more features from said list of features are selected for an authentication modality for determining the objective trustworthiness value for that modality.

6. The machine of claim 1, wherein said authentication modalities comprise one or more of the following modalities: facial recognition, fingerprint recognition, password, CAPTCHA, voice recognition, and keystroke analysis.

7. The machine of claim 1, wherein the plurality of authentication modalities comprises seven modalities: facial recognition, fingerprint recognition, password, CAPTCHA, voice recognition, and keystroke analysis.

8. The machine of claim 1, wherein the processor or microprocessor further is programmed to modify one or more trustworthiness factors.

9. The machine of claim 1, wherein the authentication verification event is an initial request by a user using a user input device to access a computer device, system, resource, or service.

10. The machine of claim 1, wherein the authentication verification event is an automatic determination of whether to allow a user using a user input device to continue having access a computer device, system, resource, or service.

* * * * *